March 24, 1936. S. B. HEATH ET AL 2,035,431
METHOD OF TREATING CRUDE SILVER IODIDE
Filed Feb. 14, 1934
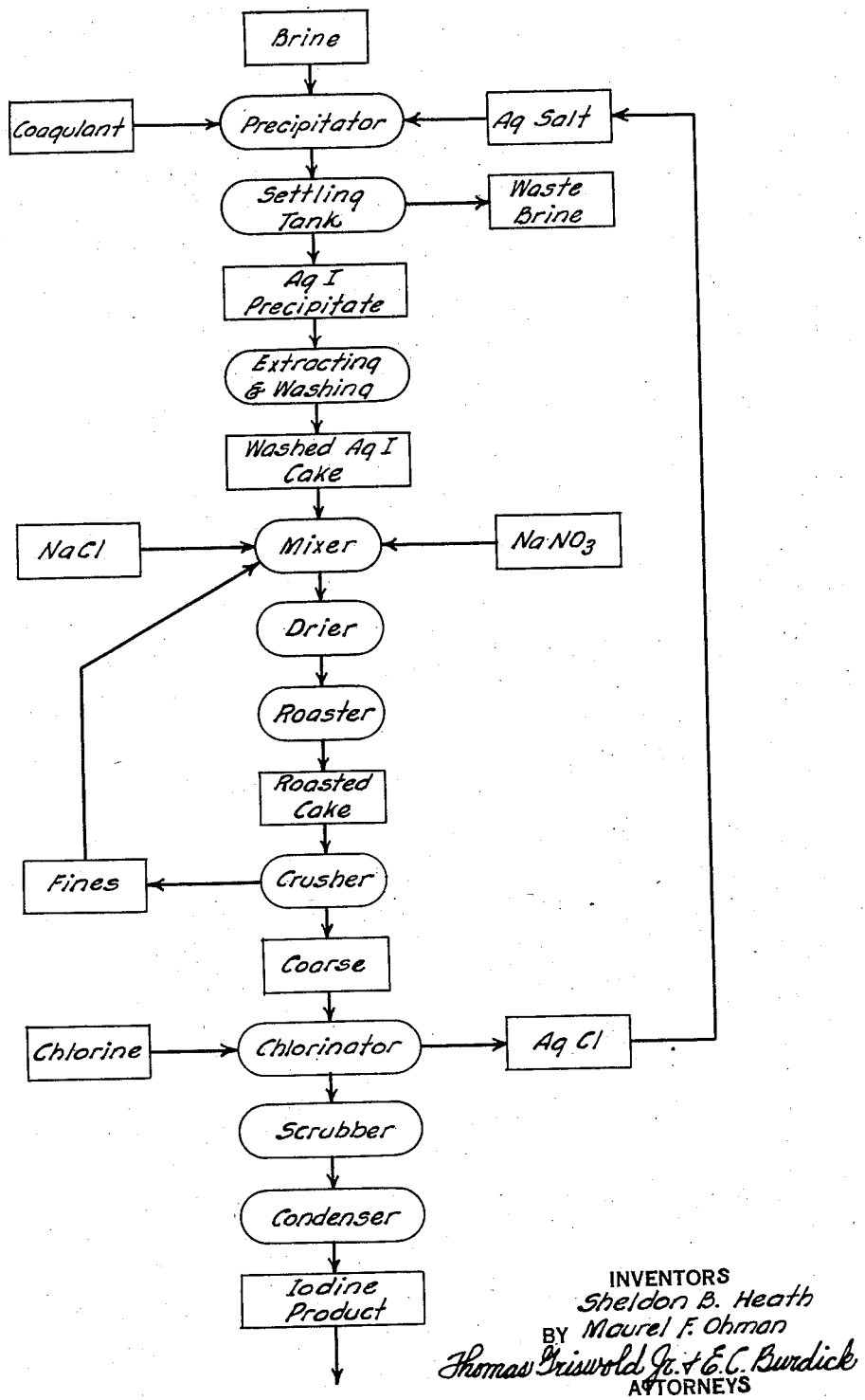
INVENTORS
Sheldon B. Heath
BY Maurel F. Ohman
Thomas Griswold Jr. & E. C. Burdick
ATTORNEYS Patented Mar. 24, 1936

2,035,431

UNITED STATES PATENT OFFICE 2,035,431

METHOD OF TREATING CRUDE SILVER IODIDE

Sheldon B. Heath and Maurel F. Ohman, Midland, Mich., assignors to The Dow Chemical Company, Midland, Mich., a corporation of Michigan Application February 14, 1934, Serial No. 711,222

16 Claims. (Cl. 23—217)

This invention relates to methods of preparing pure iodine or iodine compounds from crude silver iodide, such as is obtained in the so-called "silver process" for producing iodine from natural brines and the like. The general process, which is described in United States Patent No. 1,837,777, consists essentially in precipitating the iodides in the brine as silver iodide by treatment with a silver salt. The natural iodiferous brines, which are worked commercially for the production of iodine by the aforesaid process, occur for the most part in oil fields. The oil field brines contain considerable organic matter, which practically cannot all be removed by usual clarification and filtration treatment prior to precipitating the silver iodide. As a result, the precipitate of silver iodide obtained from such brine is considerably contaminated with organic matter which it is necessary to remove or destroy in order to prepare pure iodine or iodine compounds from the crude silver iodide.

Numerous difficulties have been encountered in the removal of this organic matter. In attempting to destroy the organic matter by roasting the crude cake, it was found that loss of iodine occurred due to decomposition of some of the silver iodide and volatilization of the liberated iodine at the temperatures required to burn out the carbon, while the silver iodide partially sintered or melted, thus enclosing some of the carbonized particles which could not then be burned out and producing a hard, dense, sintered cake which was difficult to work up further.

We have found that the loss of iodine in the aforesaid roasting operation can be avoided by incorporating an alkaline oxidizing agent, such as sodium or potassium nitrate or chlorate, with the crude silver iodide, which agent also facilitates the oxidation and removal of organic matter and carbon. The roasted cake is hard, however, and more or less sintered together, so that it is not best adapted for working up further for the preparation of iodine or commercial iodine compounds. We have found further, however, that the last mentioned disadvantage can be overcome by admixing, in addition to the oxidizing agent, a water-soluble salt, such as sodium chloride or sulphate, with the crude silver iodide and roasting the mixture at a temperature sufficient to burn off the organic matter present. This procedure not only prevents loss of iodine by volatilization, but also produces a soft, porous, carbon-free cake which is easily worked up for preparing iodine or iodine compounds. In particular is this cake well adapted for treating by direct chlorination to recover iodine therefrom, since the iodine can be liberated readily and practically quantitatively by the action of chlorine, whereas such is not the case with a dense and sintered cake. Our invention, then, consists in the improved method or process hereinafter fully described and particularly pointed out in the claims.

The crude silver iodide, which is to be purified and worked up according to the method of the present invention, is obtained in the known manner by treating the iodiferous brine with a silver salt more soluble than silver iodide; coagulating and settling the precipitate; extracting the latter with hydrochloric acid, if necessary, to remove iron compounds which are derived from the iron salt commonly employed as coagulating agent; and finally washing free from water-soluble substances and filtering. The amount of impurities in the moist cake thus obtained may vary considerably, but a typical sample may have a composition roughly as follows:

| | Per cent |
|---|---|
| AgI | 60.0 |
| $H_2O$ | 30.0 |
| Organic matter | 8.0 |
| AgCl, Fe, $SiO_2$ | 2.0 |

The cake has a pronounced empyreumatic odor, due to the organic matter, and is dark colored. To this cake is added sodium nitrate or equivalent oxidizer in amount by weight about equal to the organic matter present, together with enough water so that the whole can be mixed to a smooth paste. For example, to 100 pounds of the crude cake, about 8 pounds of sodium nitrate may be added. Larger or smaller amounts of the nitrate may, of course, be used, but the proportion stated has been found satisfactory in practice for a cake of the approximate composition given above.

The paste is transferred to shallow pans, which are filled to a depth of about 1½ to 2 inches, and the loaded pans are placed in an oven where they are baked at a temperature of about 400° to 500° C. for about one hour until the organic matter is destroyed and the carbon largely burned off. The roasting takes place without loss of iodine by volatilization. The cake is hard and dense, and consists chiefly of a mixture of silver iodide and sodium carbonate, with a smaller amount of sodium iodide and silver formed by reduction of silver iodide by the sodium carbonate. This cake can be ground to a fine powder and worked up by known procedure to recover iodine and silver therefrom; for instance, by reducing with iron or zinc in the presence of water, as described in the aforesaid Patent No. 1,837,777. In this and similar reactions the material roasted as just described is much more reactive than that prepared by previously known methods.

It is advantageous, however, to add sodium chloride or equivalent stable water-soluble salt to the mixture of crude silver iodide and sodium nitrate or chlorate. For example, to 100 pounds of crude silver iodide cake and 8 pounds of sodium nitrate about 10 pounds of sodium chloride may be added, and the whole creamed to a smooth paste with water, as before described. Instead of sodium chloride we may use any other water-soluble salt of an alkali or alkaline earth metal which is not decomposed at the roasting temperature, such as sodium sulphate, potassium chloride, potassium sulphate, calcium chloride, magnesium chloride, magnesium sulphate, etc. The proportion of such salt used may be varied greatly, but in general about the same amount as, or a little more than, the amount of oxidizing salt is sufficient. The pasty mixture is roasted in shallow pans as already described, producing a roasted cake which is light, porous and friable, in these respects being much superior to the cake produced by roasting the crude silver iodide with sodium nitrate alone. Owing to its porous character it is especially adapted to working up by direct chlorination, yielding a practically quantitative recovery of iodine, whereas with a hard, dense cake an appreciable percentage of the silver iodide remains unreacted after a chlorination treatment.

The chlorination of the aforesaid light, porous cake may be carried out in various ways, depending upon whether a strong or a weak chlorine gas is used. The reaction of chlorine with silver iodide to produce iodine and silver chloride liberates considerable heat, and provision must be made in the chlorination to prevent too great a rise in temperature of the reaction mass, otherwise the silver chloride and iodide may sinter or fuse together, thus destroying the porosity of the mass and preventing the penetration of chlorine thereinto for continuing the reaction. It is important, therefore, to provide adequate means for controlling the temperature of the chlorination. Generally speaking, this may be done (1) by mixing with the chlorine an unreactive diluent gas which will adsorb a portion of the heat of reaction and thus prevent an excessive temperature rise, or (2) by providing external cooling means, or both.

When a dilute chlorine gas is used, the roasted cake is ground to a fineness of about 80 to 150 mesh, preheated to a temperature above the boiling point of iodine, for example to about 200° C., and fed into one end of a chlorinating apparatus, which may consist of a horizontal tube provided with a central rotating shaft having stirrers attached and surrounded by a furnace for heating the apparatus. A dry mixture of chlorine and air, containing conveniently about 5 per cent of chlorine, is passed over and through the body of roasted silver iodide cake at a rate such that the temperature of the mass does not rise above about 300°–325° C. At such temperature there is no softening or sintering of the solid material, and, furthermore, an iron reactor can be employed without materially attacking the iron and contaminating the products with iron compounds. Iodine is liberated by the action of chlorine, the vapors thereof being carried out of the apparatus along with the air stream. The hot vapors are first passed through a dry scrubber filled with particles of silver iodide cake, so as to remove a small amount of dust and residual traces of chlorine. The vapors are then passed to a condenser, preferably of enameled iron, bakelite or other chemically resistant material, where they are cooled to a temperature below about 60° C. The iodine is condensed in the form of fine needle crystals, which are obtained with a purity equal to or better than the U. S. P. requirements, the yield of sublimed crystals under the conditions described being about 85 to 90 per cent of the total iodine. The non-condensable exit gases, i. e. air, from the condenser, which are naturally saturated with iodine vapors, are passed through a scrubber where they are intimately contacted with a body of metallic iron clippings or the like, or with an alkaline scrubbing solution, e. g. a solution of sodium hydroxide, to recover the iodine therefrom. The residual cake in the chlorinating apparatus normally contains less than 1.5 per cent of silver iodide. This cake, which consists principally of a mixture of silver chloride and sodium chloride, has the same soft and friable properties as the original roasted silver iodide cake, and can be easily comminuted. It may be finely ground, e. g. to about 150–200 mesh size, and used for treating more brine to precipitate silver iodide therefrom in accordance with the known process already referred to.

In the foregoing procedure the use of a 95/5 mixture of air and chlorine is optional, and not in any way limiting. Naturally the percentage of chlorine can be either greater or less than 5 per cent, e. g. from 3 to 15 per cent or more, the proportions being selected chiefly as a matter of operating convenience in controlling the reaction temperature. Other inert diluent gases or vapors than air may also be used, such as nitrogen, carbon dioxide, steam, etc.

The procedure is somewhat simpler if a strong, i. e. approximately 100 per cent, chlorine is used for the chlorination step. In this case the roasted silver iodide cake is crushed and broken up into lumps of about ½ to 1½ inch size, which are charged into the chlorinator. The latter preferably is formed of a vertical tubular element, with an inlet for chlorine at the top and an iodine vapor outlet at the bottom. The chlorinator is set in an air bath, in which it can be either heated or cooled externally. The charge of lump material is preheated to about 200° C., and then strong chlorine is admitted until a sufficient quantity has been used to react with the silver iodide in the charge. By using coarsely sized material the rate of reaction is slower than it would be with more finely divided particles, so that a suitable temperature control of the reaction is more easily maintained, while the porosity of the lumps permits thorough diffusion of chlorine thereinto, to effect a substantially complete liberation of iodine. The evolution of heat can be controlled within practical limits by regulating the supply of chlorine, so as to hold the temperature in the mass below about 325° C. and prevent sintering of the mass. The iodine vapors passing from the apparatus are led to a scrubber, to remove residual chlorine, and thence to a condenser where the product may be condensed either as liquid or as fine needle crystals, depending upon the temperature maintained, whether above or below the melting point of iodine, i. e. 114° C. Since the iodine vapors are practically free from diluent gases or vapors, a substantially complete recovery of the iodine may be obtained by condensation, without necessity for scrubbing any exit vapors. For convenience we prefer to maintain the condenser at a temperature of about 115° to 130° C., whereat the iodine condenses as liquid, which may be drawn off into molds to solidify. The product so made has a purity of 99.95 per cent under proper control of the process. The residual cake of silver chloride and sodium chloride may be obtained with a silver iodide content of 1.5 per cent or less.

Such residual cake is light and porous, and is furthermore highly reactive for precipitating silver iodide from iodide solutions, such as the oil field brines here in question. For the purpose it may be finely ground, either in wet or dry condition, and then employed for treating the brine in accordance with the known method.

In the accompanying drawing is shown a flow sheet illustrating the sequence of steps and movement of materials in a preferred embodiment of our improved method, whereby iodine of commercial purity is produced in a continuous series of operations from an iodine-containing brine, such as oil field brine. The raw brine, after clarification and sedimentation, if necessary, is run into a precipitating tank or precipitator, where it is treated with a silver salt, e. g. silver nitrate or chloride, in amount sufficient to precipitate the iodine content of the brine as silver iodide. A coagulant, e. g. ferric chloride, is also added to aid in settling the precipitate of silver iodide. The so treated brine is allowed to stand in the same tank, or in a separate settling tank, until the silver iodide precipitate has settled out, when the supernatant clear brine is drawn off and run to waste. The precipitate of silver iodide is then extracted with dilute acid to remove iron compounds derived from the coagulant, and then washed with water. The washed cake is mixed with sodium nitrate and sodium chloride, for instance in amount of about 8 pounds of sodium nitrate and 10 pounds of sodium chloride to 100 pounds of the wet silver iodide cake, and enough water added so that the mixture can be stirred up to a smooth paste. This paste is put in shallow pans in a drier and dried to remove moisture, then transferred to a roasting oven and roasted at a temperature between about 400° and 500° C. to destroy the organic matter present in the cake. The roasted material is then broken up in a crusher to form lumps of about ½ to 1½ inch in size, the fine particles being separated by screening and returned to the mixer. The coarse lumps of roasted cake are put in a chlorinator and treated with strong chlorine in amount sufficient to react with all of the silver iodide. The iodine liberated distills off, the vapors passing first to a scrubber, where they are purified from chlorine, and then to a condenser. The chlorinated product in the chlorinator, consisting chiefly of a mixture of silver chloride and sodium chloride, is finely ground and returned to the original precipitating step for the treatment of a further quantity of brine.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of treating crude silver iodide containing organic matter as impurity, the steps which consist in mixing the crude iodide with an oxidizing salt from the class consisting of the alkali metal nitrates and chlorates, and then roasting at a temperature sufficient to oxidize the organic matter present in the mixture.

2. In a method of treating crude silver iodide containing organic matter as impurity, the steps which consist in mixing the crude iodide with an alkali metal nitrate, and then roasting at a temperature sufficient to oxidize the organic matter present in the mixture.

3. In a method of treating crude silver iodide containing organic matter as impurity, the steps which consist in mixing the crude iodide with sodium nitrate and then roasting the mixture at a temperature between about 400° and 500° C. to oxidize organic matter and carbon present in the mixture.

4. In a method of treating crude silver iodide containing organic matter as impurity, the steps which consist in mixing the crude iodide with an oxidizing salt from the class consisting of the alkali metal nitrates and chlorates, and with a water-soluble salt from the class consisting of the chlorides and sulphates of the alkali metals, alkaline earth metals and magnesium, and then roasting the mixture at a temperature sufficient to oxidize the organic matter present therein.

5. In a method of treating crude silver iodide containing organic matter as impurity, the steps which consist in mixing the crude iodide with an alkali metal nitrate and an alkali metal chloride, and then roasting the mixture at a temperature sufficient to oxidize the organic matter present therein.

6. In a method of treating crude silver iodide containing organic matter as impurity, the steps which consist in mixing the crude iodide with sodium nitrate and sodium chloride, and then roasting the mixture at a temperature between about 400° and 500° C. to oxidize the organic matter present therein.

7. The method of treating crude silver iodide containing organic matter as impurity, which comprises mixing the crude iodide with an alkali metal nitrate and alkali metal chloride, roasting the mixture to remove organic matter present, and chlorinating the roasted material to liberate iodine therefrom.

8. The method of treating crude silver iodide containing organic matter as impurity, which comprises mixing the crude iodide with sodium nitrate and sodium chloride, roasting the mixture to remove organic matter present therein, and chlorinating the roasted material to liberate iodine therefrom.

9. The method of treating crude silver iodide containing organic matter as impurity, which comprises mixing the crude iodide with sodium nitrate and sodium chloride, each in amount by weight at least equal to the organic matter present, roasting the mixture at a temperature between about 400° and 500° C. to remove organic matter therefrom, and chlorinating the roasted material to liberate iodine therefrom.

10. The method of treating crude silver iodide containing organic matter as impurity, which comprises mixing the crude iodide with sodium nitrate and sodium chloride, each in amount by weight at least equal to the organic matter present in the iodide, stirring with sufficient water to make a smooth paste, roasting the pasty mixture in shallow layers at a temperature between about 400° and 500° C. to remove organic matter therefrom, comminuting the roasted material and chlorinating to liberate iodine therefrom.

11. The method of treating crude silver iodide containing organic matter as impurity, which comprises mixing the crude iodide with sodium nitrate and sodium chloride, roasting the mixture at a temperature sufficient to oxidize the organic matter present therein, comminuting the roasted material, and chlorinating to liberate iodine therefrom.

12. The method of treating crude silver iodide containing organic matter as impurity, which comprises mixing the crude iodide with sodium nitrate and sodium chloride, roasting the mixture at a temperature between about 400° and 500° C. to oxidize the organic matter present therein, comminuting the roasted material, chlorinating at a temperature between about 200° and 325° C. and recovering the iodine liberated thereby.

13. The method of treating crude silver iodide containing organic matter as impurity, which comprises mixing the crude iodide with sodium nitrate and sodium chloride, each in amount by weight at least equal to the organic matter present, stirring the mixture with water to a smooth paste, roasting the pasty mixture in shallow layers at a temperature between about 400° and 500° C. to remove organic matter therefrom, comminuting the roasted material, chlorinating at a temperature between about 200° and 325° C. and condensing the iodine vapors liberated thereby.

14. The method of treating crude silver iodide containing organic matter as impurity, which comprises mixing the crude iodide with sodium nitrate and sodium chloride, each in amount by weight at least equal to the organic matter present in the iodide, stirring the mixture with water to a smooth paste, roasting the pasty mixture in shallow layers at a temperature between about 400° and 500° C. to remove organic matter therefrom, breaking the roasted cake into pieces of about ½ to 1½ inch size, chlorinating with a strong chlorine gas at a temperature between about 200° and 325° C. and condensing the iodine vapors liberated thereby.

15. A method of recovering iodine from iodine-containing brines, in which the residual product of the chlorinating step defined in claim 13, consisting principally of silver chloride and sodium chloride, is finely ground and employed for precipitating silver iodide from such brine.

16. A method of recovering iodine from iodine-containing brines in which the silver chloride-containing product of the chlorinating step defined in claim 14 is finely ground and employed for precipitating silver iodide from such brine.

SHELDON B. HEATH.
MAUREL F. OHMAN.